US 8,718,036 B2
May 6, 2014

(12) United States Patent
Akkarakaran et al.

(54) CONFIGURABLE PILOTS IN A WIRELESS COMMUNICATION SYSTEM

(75) Inventors: Sony John Akkarakaran, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/019,865

(22) Filed: Feb. 2, 2011

(65) Prior Publication Data

US 2011/0122838 A1     May 26, 2011

Related U.S. Application Data

(63) Continuation of application No. 11/505,978, filed on Aug. 18, 2006, now abandoned.

(60) Provisional application No. 60/710,426, filed on Aug. 22, 2005.

(51) Int. Cl.
*H04B 7/208*     (2006.01)

(52) U.S. Cl.
USPC .................................................. 370/344

(58) Field of Classification Search
USPC .................... 370/335, 342, 343, 344, 441
See application file for complete search history.

(56) References Cited

U.S. PATENT DOCUMENTS

| | | | |
|---|---|---|---|
| 6,901,063 B2 | 5/2005 | Vayanos et al. | |
| 7,042,858 B1 | 5/2006 | Ma et al. | |
| 7,903,628 B2 | 3/2011 | Akkarakaran et al. | |
| 2002/0159430 A1 | 10/2002 | Atarashi et al. | |
| 2003/0095532 A1* | 5/2003 | Kim et al. | ............ 370/342 |
| 2005/0135324 A1 | 6/2005 | Kim et al. | |

(Continued)

FOREIGN PATENT DOCUMENTS

| | | |
|---|---|---|
| EP | 1503534 A1 | 2/2005 |
| JP | 2001203665 A | 7/2001 |

(Continued)

OTHER PUBLICATIONS

International Preliminary Report on Patentability—PCT/US06/032895—The International Bureau of WIPO, Geneva, Switzerland—Feb. 26, 2008.

(Continued)

*Primary Examiner* — Ajit Patel
(74) *Attorney, Agent, or Firm* — Stanton Braden

(57) ABSTRACT

Techniques for transmitting configurable pilots in a wireless communication system are described. The placement of pilots is determined based on an assignment of resources for transmission. Different placements of pilots are used for different assignments of resources. The assignment may be for one or more frames and/or one or more H-ARQ interlaces. The placement of pilot(s) in each frame or H-ARQ interlace may be determined based on the placement of pilot(s) in prior frame(s) or H-ARQ interlace(s). Pilots are sent at time and frequency locations determined by the placement of the pilots. Each pilot may be sent on one or more subcarriers in one or more symbol periods. The pilots may be TDM pilots and/or some other type of pilot. The pilots may be sent using IFDMA, LFDMA, EFDMA, OFDMA, or some other multiplexing scheme.

31 Claims, 11 Drawing Sheets

(56) References Cited

U.S. PATENT DOCUMENTS

| | | | |
|---|---|---|---|
| 2005/0249177 A1* | 11/2005 | Huo et al. | 370/342 |
| 2006/0256757 A1* | 11/2006 | Kuusela et al. | 370/335 |
| 2007/0104174 A1 | 5/2007 | Nystrom et al. | |
| 2008/0186843 A1 | 8/2008 | Ma et al. | |
| 2008/0187136 A1 | 8/2008 | Zhang et al. | |
| 2009/0279528 A1* | 11/2009 | Kent et al. | 370/342 |

FOREIGN PATENT DOCUMENTS

| | | |
|---|---|---|
| JP | 2002057601 A | 2/2002 |
| JP | 2003158499 | 5/2003 |
| RU | 2249261 | 3/2005 |
| WO | WO0143129 A1 | 6/2001 |
| WO | 2004056022 A2 | 7/2004 |
| WO | 2004098098 | 11/2004 |
| WO | WO2005041515 | 5/2005 |
| WO | 2005053198 A2 | 6/2005 |
| WO | 2005060108 A2 | 6/2005 |

OTHER PUBLICATIONS

International Search Report—PCT/US06/032895—International Search Authority, European Patent Office—Jan. 29, 2007.
Simeone et al., "Adaptive pilot pattern for OFDM Systems," 2004 IEEE International Conference on Paris, France, vol. 2, pp. 978-982.
Translation of Office Action in Chinese application 2008110960 corresponding to U.S. Appl. No. 13/019,865, citing WO05041515, US20050135324, EP1503534 and RU2249261 dated Mar. 3, 2011.
Written Opinion—PCT/US06/032895—International Search Authority, European Patent Office—Jan. 29, 2007.
European Search Report—EP10177721—Search Authority—The Munich—Jan. 15, 2013.
Yavuz et al., "Performance Improvement of the HDR System Due to Hybrid ARQ", IEEE Vehicular Technology Conference, 2001, IEEE VTS 54th, Oct. 11, 2001, vol. 4, p. 2192-2196.

* cited by examiner

CONFIGURABLE PILOTS IN A WIRELESS COMMUNICATION SYSTEM

The present applications is a continuation application and claims priority to U.S. Ser. No. 11/505,978, filed Aug. 17, 2006, entitled "CONFIGURABLE PILOTS IN A WIRELESS COMMUNICATION SYSTEM," which claims priority to provisional U.S. Application Ser. No. 60/710,426, entitled "A METHOD FOR PILOT OVERHEAD REDUCTION IN IFDMA SYSTEMS," filed Aug. 22, 2005, assigned to the assignee hereof and incorporated herein by reference.

BACKGROUND

I. Field

The present disclosure relates generally to communication and more specifically to pilot transmission in a wireless communication system.

II. Background

In a wireless communication system, a transmitter typically processes (e.g., encodes and symbol maps) traffic data to generate data symbols, which are modulation symbols for data. For a coherent system, the transmitter multiplexes pilot symbols with the data symbols, processes the multiplexed data and pilot symbols to generate a modulated signal, and transmits this signal via a wireless channel. The wireless channel distorts the transmitted signal with a channel response and further degrades the signal with noise and interference.

A receiver receives the transmitted signal and processes the received signal to obtain received data and pilot symbols. For coherent data detection, the receiver estimates the response of the wireless channel based on the received pilot symbols and obtains a channel estimate. The receiver then performs data detection (e.g., equalization) on the received data symbols with the channel estimate to obtain data symbol estimates, which are estimates of the data symbols sent by the transmitter. The receiver then processes (e.g., demodulates and decodes) the data symbol estimates to obtain decoded data.

The quality of the channel estimate has a large impact on data detection performance and affects the quality of the data symbol estimates as well as the reliability of the decoded data. The receiver can typically obtain a better channel estimate if the transmitter transmits more pilots. However, more pilots represent greater overhead that reduces the efficiency of the system.

There is therefore a need in the art for techniques to transmit pilots in an efficient manner to achieve good performance while reducing pilot overhead.

SUMMARY

Techniques for transmitting configurable pilots in a wireless communication system are described herein. In an aspect, the placement of pilots is determined based on an assignment of resources for transmission. Different placements of pilots are used for different assignments of resources, which may correspond to different numbers of frames, different numbers of H-ARQ interlaces, different numbers of subcarriers, and so on. Pilots are sent at time and frequency locations determined by the placement of the pilots. Each pilot may be sent on one or more subcarriers in one or more symbol periods.

The resource assignment may be for one or more consecutive frames. The placement of pilot(s) in each frame may then be determined based on the placement of pilot(s) in prior frame(s), if any. The assignment may also be for one or more H-ARQ interlaces. The placement of pilot(s) in each H-ARQ interlace may then be determined based on the number of H-ARQ interlaces in the assignment, the placement of pilot(s) in preceding H-ARQ interlace(s), if any, and so on. The placement of pilots may be determined by one or more pilot patterns. Different pilot patterns may be used for different assignments of resources. At least one pilot pattern may be selected for use based on the resource assignment.

The pilots may be time division multiplexed (TDM) pilots and/or some other type of pilot. The pilots may be sent using various multiplexing schemes such as IFDMA, LFDMA, EFDMA, OFDMA, and so on. Pilots and data may be sent using the same or different multiplexing schemes.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
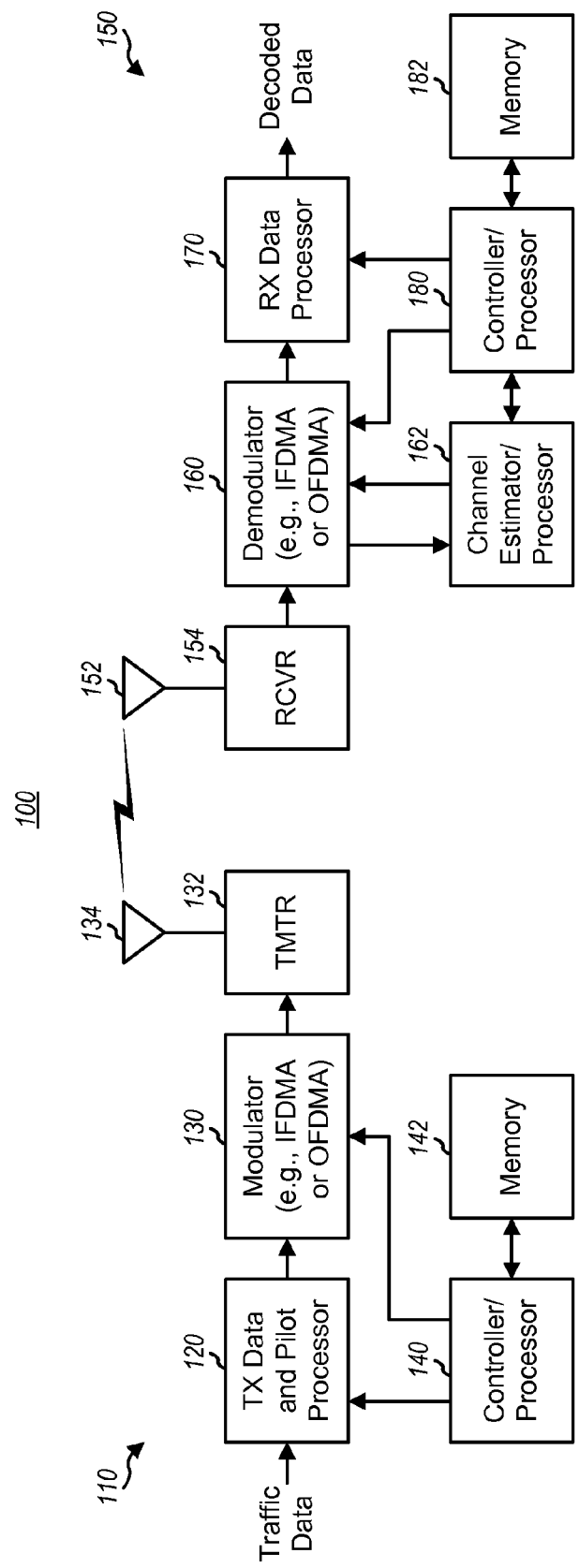
FIG. 1 shows a block diagram of a transmitter and a receiver.

FIG. 1 shows a block diagram of a transmitter 110 and a receiver 150 in a wireless communication system 100. For the forward link (or downlink), transmitter 110 may be part of a base station, and receiver 150 may be part of a terminal. For the reverse link (or uplink), transmitter 110 may be part of a terminal, and receiver 150 may be part of a base station. A base station is a station that communicates with the terminals. A base station may also be called, and may contain some or all of the functionality of, a base transceiver system (BTS), an access point, a Node B, or some other network entity. A terminal may be fixed or mobile and may also be called, and may contain some or all of the functionality of, an access terminal (AT), a mobile station (MS), a user equipment (UE), and/or some other entity. A terminal may be a wireless device, a cellular phone, a personal digital assistant (PDA), a wireless modem, a handheld device, and so on.

At transmitter 110, a transmit (TX) data and pilot processor 120 processes (e.g., encodes, interleaves, and symbol maps) traffic data and signaling and generates data symbols. Processor 120 also generates pilot symbols and multiplexes the data symbols and pilot symbols. In general, a data symbol is a modulation symbol for data, a pilot symbol is a modulation symbol for pilot, a modulation symbol is a complex value for a point in a signal constellation (e.g., for PSK or QAM), and a symbol is a complex value. A pilot is data/transmission that is known a priori by both the transmitter and receiver. A modulator 130 performs modulation on the data and pilot symbols for one or more multiplexing schemes/radio technologies and generates output chips. A transmitter (TMTR) 132 processes (e.g., converts to analog, amplifies, filters, and frequency upconverts) the output chips and generates a radio frequency (RF) modulated signal, which is transmitted via an antenna 134.

At receiver 150, an antenna 152 receives the RF modulated signal from transmitter 110 and provides a received signal to a receiver (RCVR) 154. Receiver 154 conditions (e.g., filters, amplifies, frequency downconverts, and digitizes) the received signal and provides samples. A demodulator 160 performs demodulation on the samples and obtains received data symbols and received pilot symbols. A channel estimator/processor 162 may derive various types of channel information (e.g., a channel estimate, a received signal quality estimate, an interference estimate, and so on) based on the received pilot symbols. Demodulator 160 then performs data detection (e.g., equalization or matched filtering) on the received data symbols with the channel information and provides data symbol estimates. An RX data processor 170 processes (e.g., symbol demaps, deinterleaves, and decodes) the data symbol estimates and provides decoded data. In general, the processing by receiver 150 is complementary to the processing by transmitter 110.

Controllers/processors 140 and 180 direct the operation of various processing units at transmitter 110 and receiver 150, respectively. Memories 142 and 182 store program codes and data for transmitter 110 and receiver 150, respectively.

System 100 may employ a hybrid automatic repeat request (H-ARQ) transmission scheme. With H-ARQ, the transmitter sends one or more transmissions for a data packet until the packet is decoded correctly by the receiver or the maximum number of transmissions has been sent. H-ARQ improves reliability for data transmission and supports rate adaptation for packets in the presence of changes in the channel conditions.

Figure 2A:
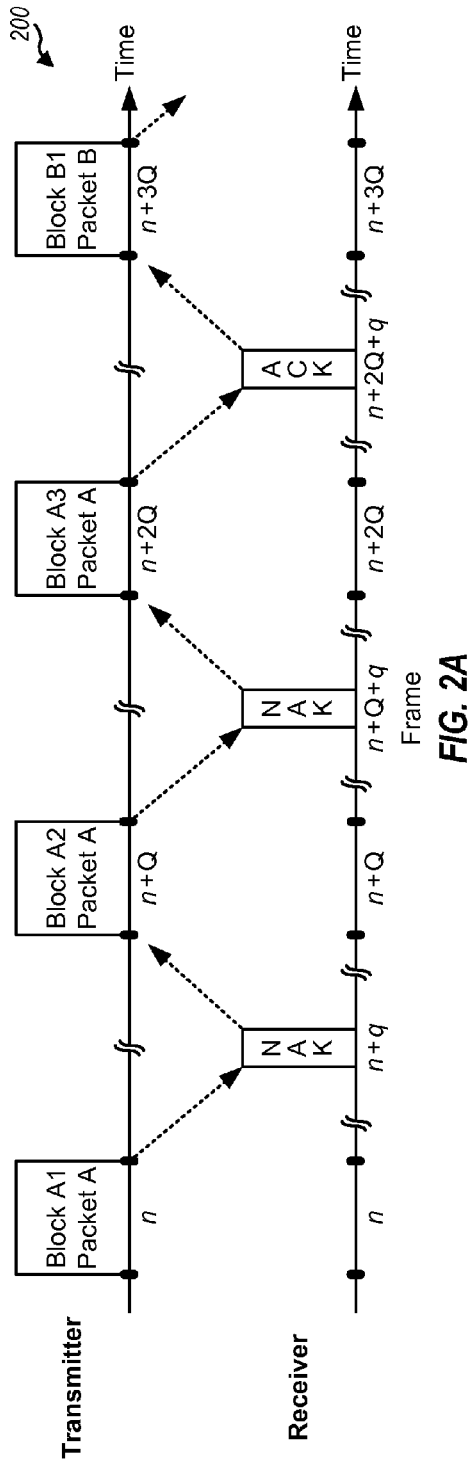
FIG. 2A illustrates an H-ARQ transmission.

FIG. 2A illustrates an H-ARQ transmission. The transmitter processes (e.g., encodes and modulates) a data packet (Packet A) and generates multiple (D) data blocks. A data packet may also be called a codeword and so on. A data block may also be called a subpacket, an H-ARQ transmission, and so on. Each data block for the packet may contain sufficient information to allow the receiver to correctly decode the packet under favorable channel conditions. The D data blocks typically contain different redundancy information for the packet. Each data block may be sent in a frame, which may span any duration of time. The D data blocks are sent one at a time until the packet is terminated, and the block transmissions are spaced apart by Q frames, where Q>1.

The transmitter transmits the first data block (Block A1) for Packet A in frame n. The receiver receives and processes (e.g., demodulates and decodes) Block A1, determines that Packet A is decoded in error, and sends a negative acknowledgement (NAK) to the transmitter in frame n+q, where q is the feedback delay and $1 \leq q < Q$. The transmitter receives the NAK and transmits the second data block (Block A2) for Packet A in frame n+Q. The receiver receives Block A2, processes Blocks A1 and A2, determines that Packet A is decoded in error, and sends a NAK in frame n+Q+q. The block transmission and NAK response may continue up to D times. In the example shown in FIG. 2A, the transmitter transmits the third data block (Block A3) for Packet A in frame n+2Q. The receiver receives Block A3, processes Blocks A1 through A3, determines that Packet A is decoded correctly, and sends an acknowledgement (ACK) in frame n+2Q+q. The transmitter receives the ACK and terminates the transmission of Packet A. The transmitter then processes the next data packet (Packet B) and transmits the data blocks for Packet B in similar manner.

In FIG. 2A, a new data block is sent every Q frames. To improve channel utilization, the transmitter may transmit up to Q packets in an interlaced manner.

Figure 2B:
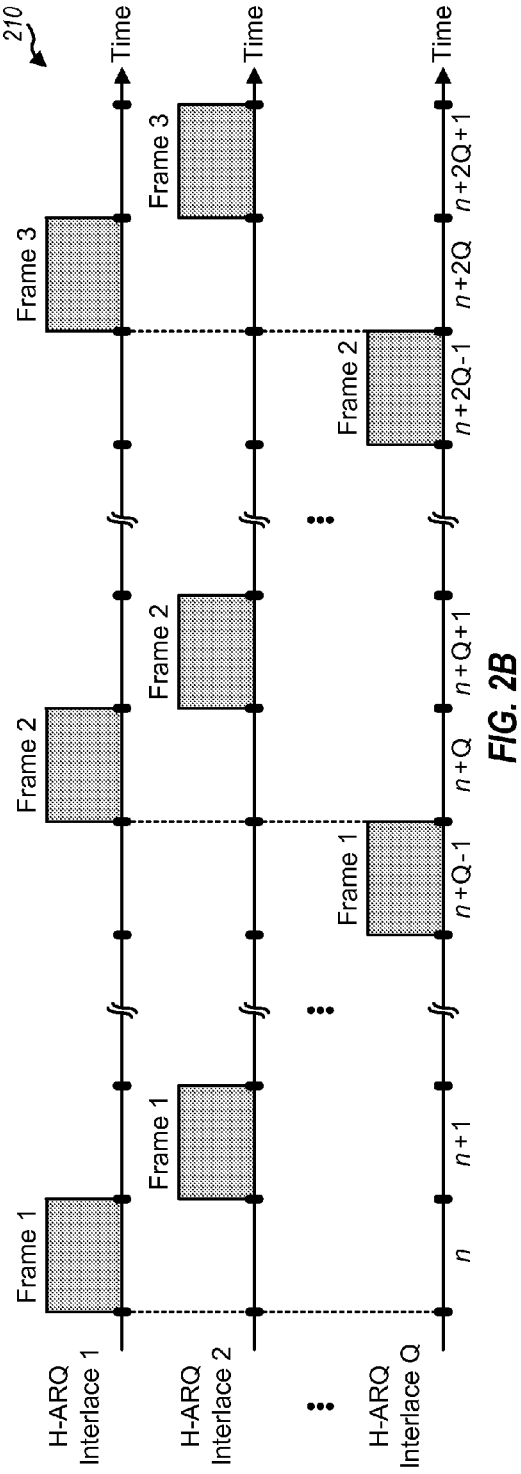
FIG. 2B shows multiple H-ARQ interlaces.

FIG. 2B shows an embodiment of multiple (Q) H-ARQ interlaces. In this embodiment, H-ARQ interlace 1 includes frames n, n+Q, and so on, H-ARQ interlace 2 includes frames n+1, n+Q+1, and so on, and H-ARQ interlace Q includes frames n+Q−1, n+2Q−1, and so on. The Q H-ARQ interlaces are offset from one another by one frame. For example, if Q=2, then H-ARQ interlace 1 may include odd-numbered frames, and H-ARQ interlace 2 may include even-numbered frames. In general, the H-ARQ retransmission delay Q and the feedback delay q are typically selected to provide sufficient processing time for both the transmitter and receiver. The transmitter may transmit up to Q packets on the Q H-ARQ interlaces.

System 100 may utilize various multiplexing schemes/radio technologies such as Single-Carrier Frequency Division Multiple Access (SC-FDMA), Orthogonal Frequency Division Multiple Access (OFDMA), Code Division Multiple Access (CDMA), Time Division Multiple Access (TDMA), Frequency Division Multiple Access (FDMA), and so on. SC-FDMA includes Interleaved FDMA (IFDMA), Localized FDMA (LFDMA), and Enhanced FDMA (EFDMA). IFDMA is also called distributed FDMA, and LFDMA is also called narrowband FDMA or classical FDMA. Data and pilot may be sent on (1) subcarriers that are uniformly distributed across the system bandwidth with IFDMA, (2) a group of adjacent subcarriers with LFDMA, or (3) multiple groups of adjacent subcarriers with EFDMA. OFDMA utilizes Orthogonal Frequency Division Multiplexing (OFDM). In general, modulation symbols are sent in the time domain with SC-FDMA and in the frequency domain with OFDMA. A major drawback with OFDMA is a high peak-to-average power ratio (PAPR), which means that the ratio of the peak power to the average power of an OFDM waveform can be high. The PAPR of an SC-FDMA waveform is determined by the signal points in the signal constellation selected for use (e.g., PSK or QAM) and is lower than the PAPR of an OFDM waveform.

System 100 may utilize one or more multiplexing schemes for each of the forward and reverse links. For example, system 100 may utilize (1) SC-FDMA for both the forward and reverse links, (2) one version of SC-FDMA (e.g., LFDMA) for one link and another version of SC-FDMA (e.g., IFDMA) for the other link, (3) OFDMA for both the forward and reverse links, (4) SC-FDMA for one link (e.g., reverse link) and OFDMA for the other link (e.g., forward link), or (5) some other combination of multiplexing schemes. It may be desirable to use SC-FDMA (e.g., IFDMA) on the reverse link to achieve lower PAPR and to use OFDMA on the forward link to potentially achieve higher system capacity.

Figure 3A:
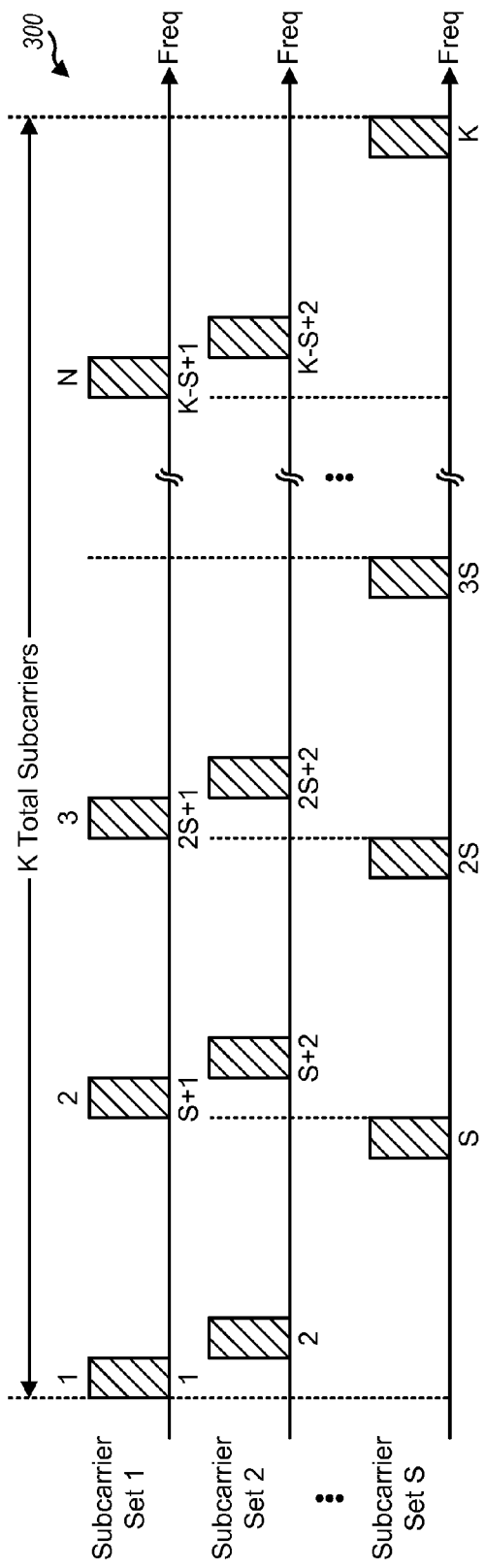
FIGS. 3A, 3B and 3C show three exemplary subcarrier structures.

FIG. 3A shows a subcarrier structure 300 that may be used for IFDMA and OFDMA. The system bandwidth of BW MHz is partitioned into multiple (K) orthogonal subcarriers that are given indices of 1 through K, where K may be any integer value but is typically a power of two. The subcarriers may also be referred to as tones, bins, and so on. The spacing between adjacent subcarriers is BW/K MHz. For simplicity, the following description assumes that all K total subcarriers are usable for transmission. For subcarrier structure 300, the K total subcarriers are arranged into S non-overlapping sets such that each set contains N subcarriers that are uniformly distributed across the K total subcarriers, where K=S·N. Consecutive subcarriers in each set are spaced apart by S subcarriers. Hence, set s contains subcarriers s, S+s, 2S+s, . . . , (N−1)·S+s, for s∈{1, . . . , S}.

Figure 3B:
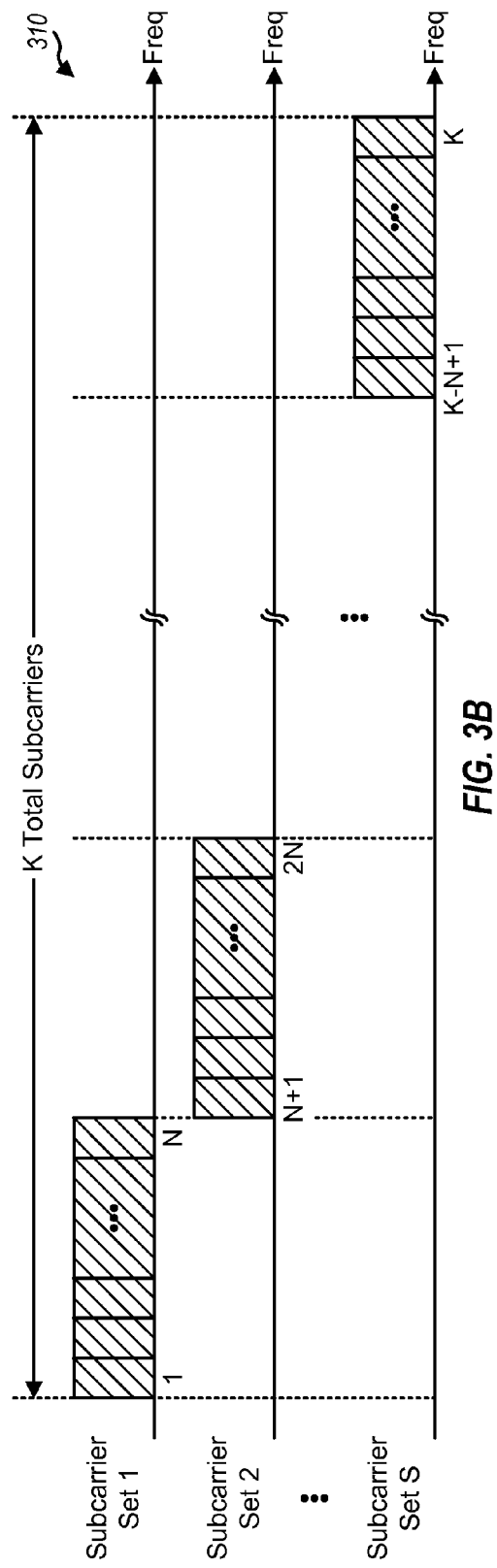

FIG. 3B shows a subcarrier structure 310 that may be used for LFDMA and OFDMA. For subcarrier structure 310, the K total subcarriers are arranged into S non-overlapping sets such that each set contains N consecutive subcarriers, where K=S·N. Hence, set s contains subcarriers (s−1)·N+1 through s·N , for s∈{1, . . . , S}.

Figure 3C:
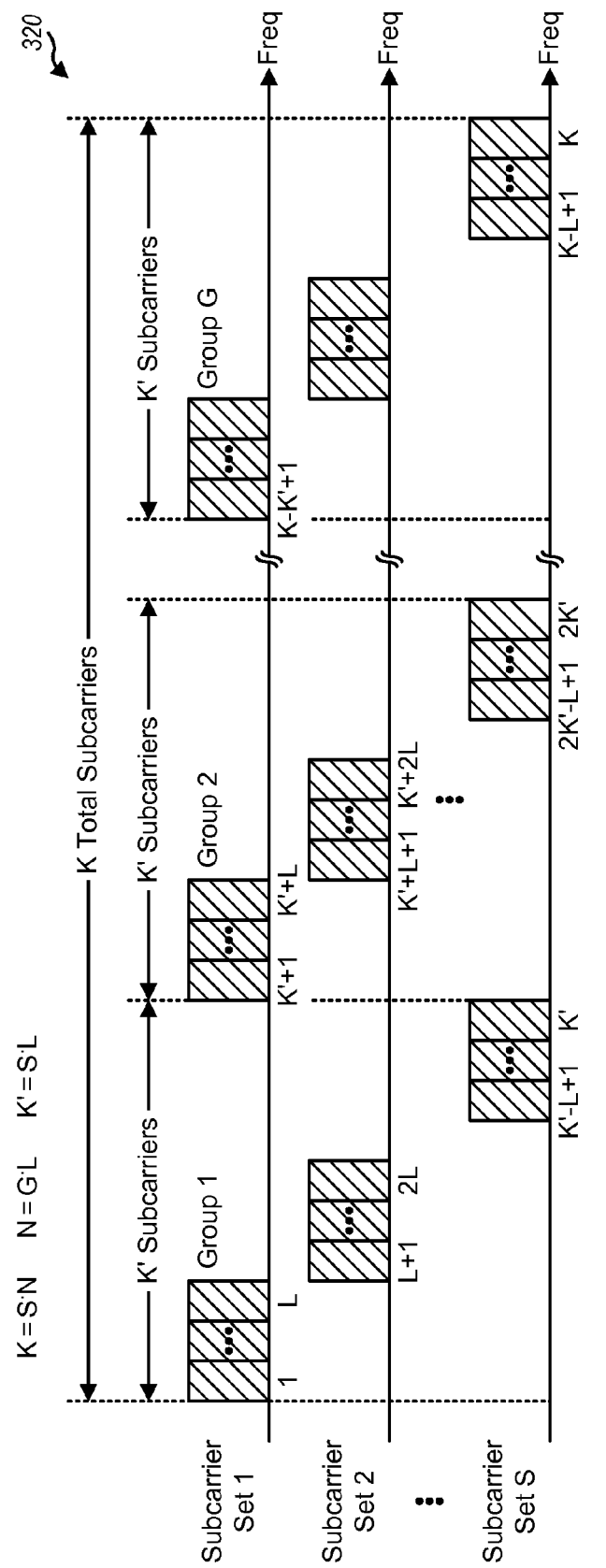

FIG. 3C shows a subcarrier structure 320 that may be used for EFDMA and OFDMA. For subcarrier structure 320, the K total subcarriers are arranged into S non-overlapping sets such that each set contains N subcarriers that are arranged into G groups of L consecutive subcarriers, where K=S·N and N=G·L. The K total subcarriers may be distributed to the S sets as follows. The K total subcarriers are first partitioned into multiple frequency ranges, with each frequency range containing K'=S·L consecutive subcarriers. Each frequency range is further partitioned into S groups, with each group including L adjacent subcarriers. For each frequency range, the first group of L subcarriers is allocated to set 1, the next group of L subcarriers is allocated to set 2, and so on, and the last group of L subcarriers is allocated to set S. Set s, for s∈{1, . . . , S}, contains subcarriers having indices k that satisfy the following: (s−1)·L<(k modulo K')≤s·L .

In general, a subcarrier structure may include any number of sets, and each set may contain any number of subcarriers. The sets may contain the same or different numbers of subcarriers, and the number of subcarriers in each set may or may not be an integer divisor of K. The subcarriers in each set may be arranged in any manner, e.g., distributed uniformly or non-uniformly across the system bandwidth. Modulation symbols may be sent on one or more subcarrier sets in either the time domain with SC-FDMA or the frequency domain with OFDMA.

An SC-FDMA symbol may be generated for one subcarrier set in one symbol period as follows. N modulation symbols to be sent on N subcarriers are transformed to the frequency domain with an N-point fast Fourier transform (FFT) to obtain N frequency-domain values. These N frequency-domain values are mapped to the N subcarriers used for transmission, and zero values are mapped to the remaining K-N subcarriers. A K-point inverse FFT (IFFT) is then performed on the K frequency-domain values and zero values to obtain a sequence of K time-domain samples. The last C samples of the sequence are copied to the start of the sequence to form an SC-FDMA symbol that contains K+C samples. The C copied samples are often called a cyclic prefix or a guard interval, and C is the cyclic prefix length. The cyclic prefix is used to combat intersymbol interference (ISI) caused by frequency selective fading.

An OFDM symbol may be generated for one symbol period as follows. Modulation symbols are mapped to subcarriers used for transmission, and zero symbols with signal value of zero are mapped to the remaining subcarriers. A K-point IFFT is then performed on the K modulation symbols and zero symbols to obtain a sequence of K time-domain samples. The last C samples of the sequence are copied to the start of the sequence to form an OFDM symbol that contains K+C samples.

A transmission symbol may be an OFDM symbol or an SC-FDMA symbol. An SC-FDMA symbol may be an IFDMA symbol, an LFDMA symbol, or an EFDMA symbol. The K+C samples of a transmission symbol are transmitted in K+C sample periods. A symbol period is the duration of one transmission symbol and is equal to K+C sample periods.

The pilot transmission techniques described herein may be used for the forward and reverse links. The techniques may also be used for various multiplexing schemes such as SC-FDMA and OFDMA. For clarity, certain aspects and embodiments of the techniques are described for IFDMA.

A single set of N subcarriers may be assigned for transmission on a single H-ARQ interlace. If each frame spans T symbol periods, then N·T transmission units are available in each frame of the assigned H-ARQ interlace, where a transmission unit is one subcarrier in one symbol period. A total of N·T symbols may be sent in each frame of the H-ARQ interlace. For OFDMA, any P transmission units among the N·T total transmission units may be used for pilot transmission, and P pilot symbols may be sent on these P transmission units. For SC-FDMA, pilots may be sent in a TDM manner in order to preserve low PAPR. In this case, N pilot symbols may be sent on the N subcarriers in each symbol period used for pilot transmission. Alternatively, pilot symbols may be sent on some subcarriers and data symbols may be sent on remaining subcarriers in a given symbol period. This multiplexing of pilot and data in the same symbol period results in higher PAPR.

In general, it is desirable to transmit a sufficient amount of pilots to allow the receiver to derive a reasonably good channel estimate. The pilots should be distributed across both frequency and time in order to capture frequency and time variations in the channel. For both SC-FDMA and OFDMA, increasing the number of pilot symbols may improve channel estimation performance. However, the penalty is fewer number of transmission units available for data transmission. In this case, either the information bit rate may be reduced or the coding gain of an error correction code may be lowered, which may then reduce coverage and/or increase the likelihood of decoding errors. Since pilots represent overhead, it is desirable to minimize the amount of pilots while achieving the above goals.

For simplicity, the following embodiment is used for the description below. The system has K=16 total subcarriers that are arranged into S=4 subcarrier sets. Each subcarrier set includes N=4 subcarriers that are uniformly distributed across the 16 total subcarriers. The system also has Q≥3 H-ARQ interlaces. Each frame spans T=8 symbol periods, and a transmission symbol (e.g., an IFDMA symbol or an OFDM symbol) may be sent in each symbol period. The system uses symbol-rate hopping so that a different subcarrier set may be used for transmission in each symbol period. The particular subcarrier set to use in each symbol period may be determined by a frequency-hopping pattern that is known by both the transmitter and the receiver. Frequency hopping may improve frequency diversity.

Figure 4A:
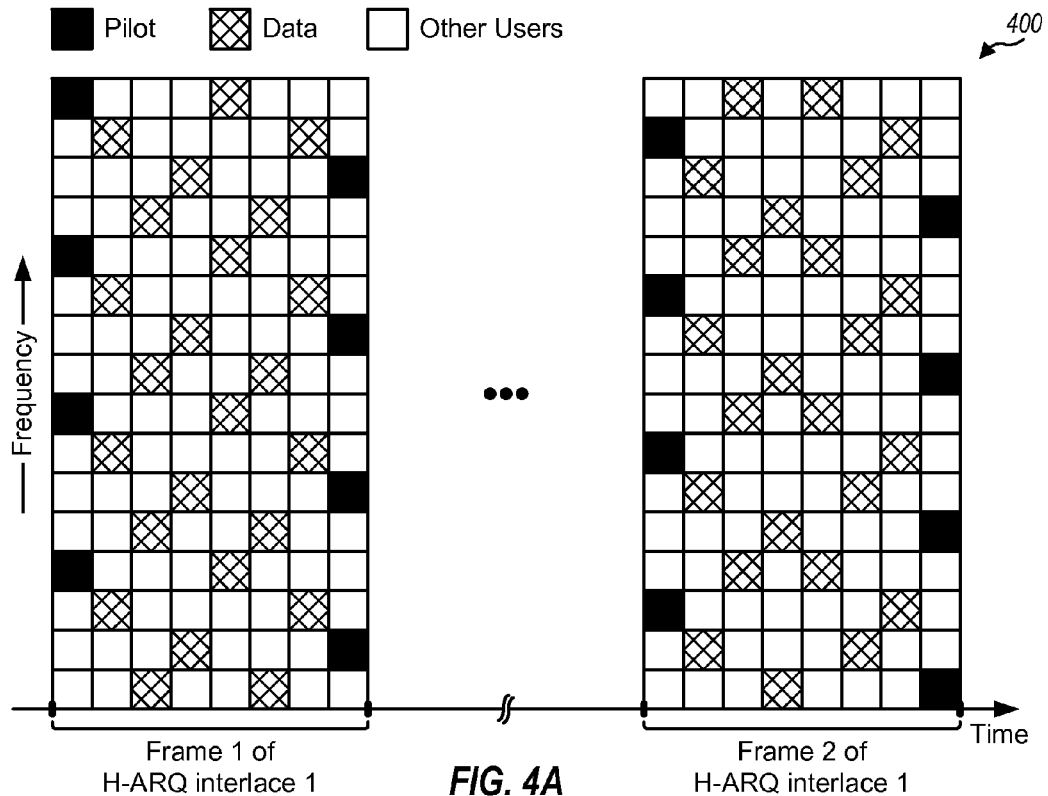
FIG. 4A shows an exemplary pilot pattern for one H-ARQ interlace.

FIG. 4A shows an embodiment of a pilot pattern 400 that may be used for transmission on a single subcarrier set in one H-ARQ interlace. For pilot pattern 400, TDM pilots are sent in the first and last symbol periods of each frame in the assigned H-ARQ interlace. Each TDM pilot is composed of pilot symbols that are sent on all assigned subcarriers in a symbol period. The TDM pilots maintain a low PAPR for a transmission sent using SC-FDMA. The transmission of each TDM pilot across the K total subcarriers allows the receiver to capture frequency variations in the channel and to estimate the channel response across the system bandwidth. The transmission of the TDM pilots in the first and last symbol periods allows the receiver to capture time variations in the channel. In general, the TDM pilots should be (1) reasonably separated from each other to capture channel variations across time but (2) should not be too far apart to allow for sufficient "sampling" of the channel response. The pilot placement shown in FIG. 4A may be useful for a fast changing channel, e.g., a channel with high Doppler due to vehicular movement. If TDM pilots are used as shown in FIG. 4A, then the design choices may be limited to the number of TDM pilots to send and the locations of these TDM pilots on the time axis.

In general, a pilot pattern may include any number of pilots that may be sent on any transmission units in a frame. Different pilot patterns may be evaluated, with each pilot pattern having different placement of pilots in a frame. The pilot pattern that provides the best performance may be selected for use.

Pilot pattern 400 may provide good performance when a transmission is sent periodically, e.g., in every Q frames on the assigned H-ARQ interlace, as shown in FIG. 4A. Since the frames of the assigned H-ARQ interlace are spaced apart in time, time variations in the channel may result in the pilot observations in one frame being stale or obsolete for another frame. Hence, each frame should include sufficient amount of pilots to allow the receiver to derive a good channel estimate for that frame.

Figure 4B:
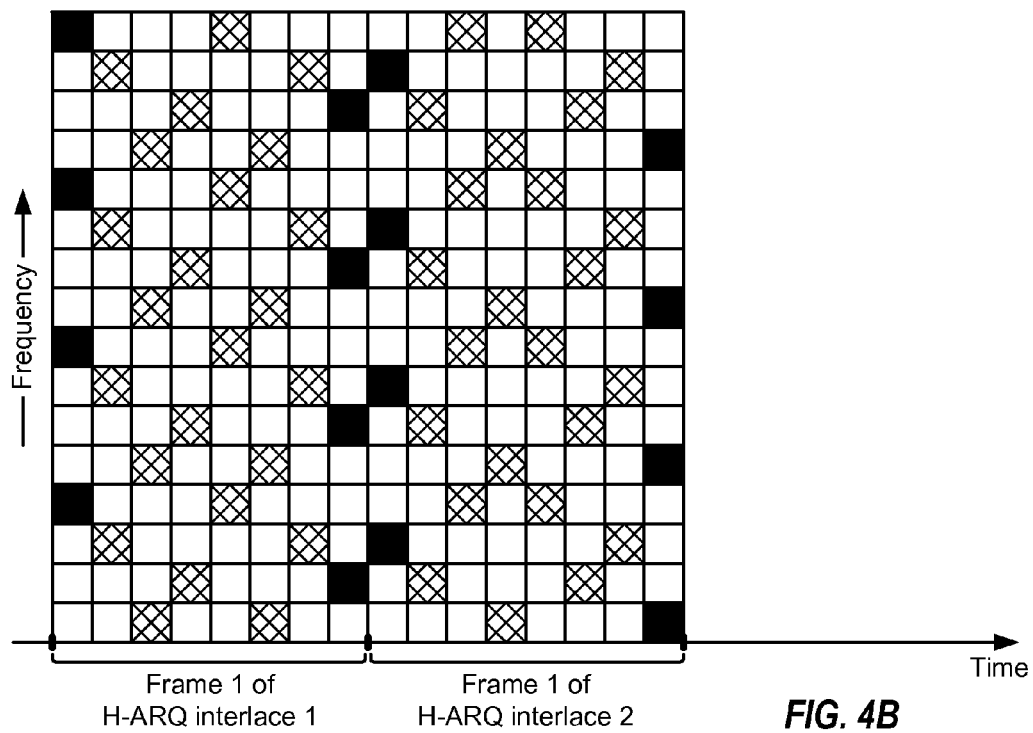
FIG. 4B shows use of the pilot pattern in FIG. 4A for two H-ARQ interlaces.

FIG. 4B shows use of pilot pattern 400 for transmission on two consecutive H-ARQ interlaces. In this example, H-ARQ interlaces 1 and 2 are assigned, and TDM pilots are sent in the first and last symbol periods of each frame in each assigned H-ARQ interlace. As shown in FIG. 4B, the TDM pilot sent in the last symbol period of frame 1 of H-ARQ interlace 1 is right next to the TDM pilot sent in the first symbol period of frame 1 of H-ARQ interlace 2. These TDM pilots would be essentially redundant and would represent inefficient use of the system resources. As shown in FIGS. 4A and 4B, pilot pattern 400 may be good for transmission on one H-ARQ interlace but is inefficient for transmission on multiple consecutive H-ARQ interlaces.

In an aspect, the amount of pilots and the placement of the pilots are determined by the assignment of resources for transmission. In an embodiment, different pilot patterns are used for different assignments of resources, which may correspond to different numbers of frames, different numbers of H-ARQ interlaces, different numbers of subcarriers, and so on. One or more pilot patterns may be used for each different resource assignment and may be designed to provide good performance while reducing pilot overhead.

Figure 5A:
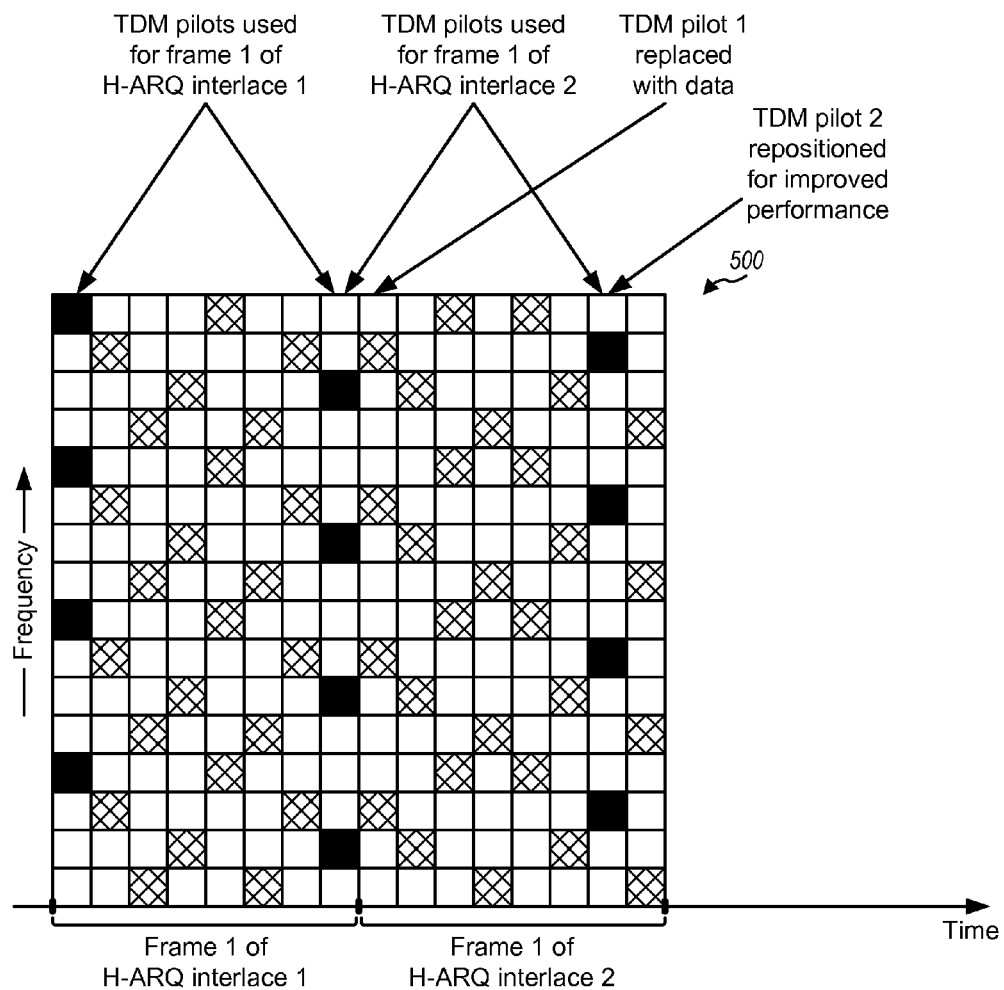
FIG. 5A shows a 2-frame pilot pattern for two H-ARQ interlaces.

FIG. 5A shows an embodiment of a 2-frame pilot pattern 500 that may be used for transmission on a single subcarrier set in two consecutive H-ARQ interlaces. A multi-frame pilot pattern may be viewed as a concatenation of multiple single-frame pilot patterns. For pilot pattern 500, TDM pilots are sent in the first and last symbol periods of frame 1 of H-ARQ interlace 1 (or Frame 1,1), and a TDM pilot is sent in the second to last symbol period of frame 1 of H-ARQ interlace 2 (or Frame 1,2). A channel estimate for Frame 1,1 may be derived based on the TDM pilots sent in the first and last symbol periods of this frame. A channel estimate for Frame 1,2 may be derived based on the TDM pilot sent in the last symbol period of Frame 1,1 and the TDM pilot sent in the second to last symbol period of Frame 1,2. The TDM pilot in the first symbol period of Frame 1,2 is replaced with data. The TDM pilot in Frame 1,2 may be repositioned to improve performance.

Figure 5B:
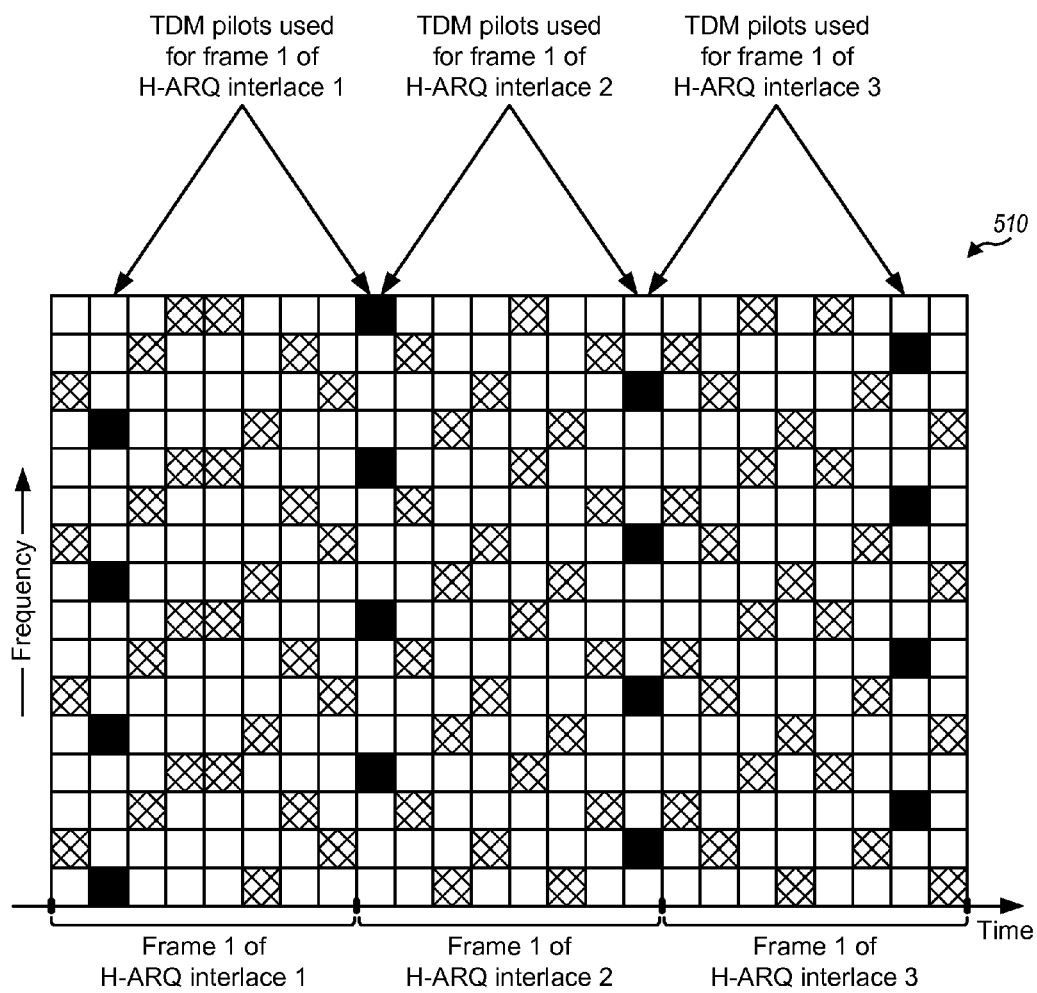
FIG. 5B shows a 3-frame pilot pattern for three H-ARQ interlaces.

FIG. 5B shows an embodiment of a 3-frame pilot pattern 510 that may be used for transmission on a single subcarrier set in three consecutive H-ARQ interlaces. For pilot pattern 510, a TDM pilot is sent in the second symbol period of frame 1 of H-ARQ interlace 1 (or Frame 1,1), TDM pilots are sent in the first and last symbol periods of frame 1 of H-ARQ interlace 2 (or Frame 1,2), and a TDM pilot is sent in the second to last symbol period of frame 1 of H-ARQ interlace 3 (or Frame 1,3). A channel estimate for Frame 1,1 may be derived based on the TDM pilot sent in the second symbol period of that frame and the TDM pilot sent in the first symbol period of Frame 1,2. A channel estimate for Frame 1,2 may be derived based on the TDM pilots sent in the first and last symbol periods of that frame. A channel estimate for Frame 1,3 may be derived based on the TDM pilot sent in the last symbol period of Frame 1,2 and the TDM pilot sent in the second to last symbol period of Frame 1,3.

FIGS. 5A and 5B show exemplary pilot patterns for two and three consecutive H-ARQ interlaces, respectively. These pilot patterns maintain a uniform spacing of 7 symbol periods between consecutive TDM pilots. Other pilot patterns may also be defined and used for transmission.

In an embodiment, different single-frame pilot patterns may be used for different frames depending on the resource assignment, e.g., as shown in FIGS. 5A and 5B. In this embodiment, the pilot patterns for different frames may have the TDM pilots located in different symbol periods. In the embodiment shown in FIG. 5A, the TDM pilot for Frame 1,2 is moved one symbol period earlier to improve channel estimation performance for this frame. In the embodiment shown in FIG. 5B, the TDM pilot for Frame 1,1 is moved one symbol period later, and the TDM pilot for Frame 1,3 is moved one symbol period earlier to improve channel estimation performance for these frames.

In another embodiment, the same pilot pattern is used for each frame, but redundant TDM pilots may be replaced with data. In FIG. 5A, a TDM pilot may be sent in the last symbol period (instead of the second to last symbol period) of Frame 1,2. In FIG. 5B, a TDM pilot may be sent in the first symbol period (instead of the second symbol period) of Frame 1,1, and a TDM pilot may be sent in the last symbol period (instead of the second to last symbol period) of Frame 1,3. Either the TDM pilot in the last symbol period of a frame or the TDM pilot in the first symbol period of the following frame may be replaced with data.

In general, any set of pilot pattern(s) that provides good performance may be used for each different H-ARQ assignment. A single-frame pilot pattern may be used for an assignment of one H-ARQ interlace, a 2-frame pilot pattern may be used for an assignment of two H-ARQ interlaces, a 3-frame pilot pattern may be used for an assignment of three H-ARQ interlaces, and so on. Each pilot pattern may be designed to provide good performance for the associated number of H-ARQ interlaces. The available pilot patterns may be known to the transmitter and receiver in advance so that both know the specific pilot pattern to use for transmission depending on the H-ARQ assignment.

FIGS. 5A and 5B show cases in which the resource assignments may be static and known in advance. For each assignment, the proper pilot pattern may be selected for use for the entire transmission. For example, pilot pattern 500 may be used if two consecutive H-ARQ interlaces are assigned, and pilot pattern 510 may be used if three consecutive H-ARQ interlaces are assigned. A different pilot pattern may be selected whenever the assignment changes, which may occur frequently or infrequently.

The resource assignments may be dynamic, may change rapidly over time, and may not be known far in advance. In this case, it may not be possible to select a specific pilot pattern to use for an extended period of time since the selected pilot pattern may not perform well for different assignments. For example, a packet may be sent on a given H-ARQ interlace until the packet is terminated, and a new packet may then be sent on this H-ARQ interlace. In a multiple-access system, the available H-ARQ interlaces may be shared by all users, and new packets may be sent whenever H-ARQ interlaces become available. The uncertainty over when new packets may be sent as well as the H-ARQ interlaces used to send these packets may result in dynamic and unpredictable assignments of resources.

In an embodiment, pilot patterns are dynamically selected based on current and prior assignments. The pilot pattern selection may be performed for each transmission burst, which is a continuous transmission in one or more consecutive frames. The duration of each transmission burst may not be known in advance. For example, whether or not the next frame will be assigned may not be known until the current frame. The pilot pattern for each frame may be selected based on the pilot pattern(s) used for prior frame(s), if any, in the current transmission burst.

Figure 6A:
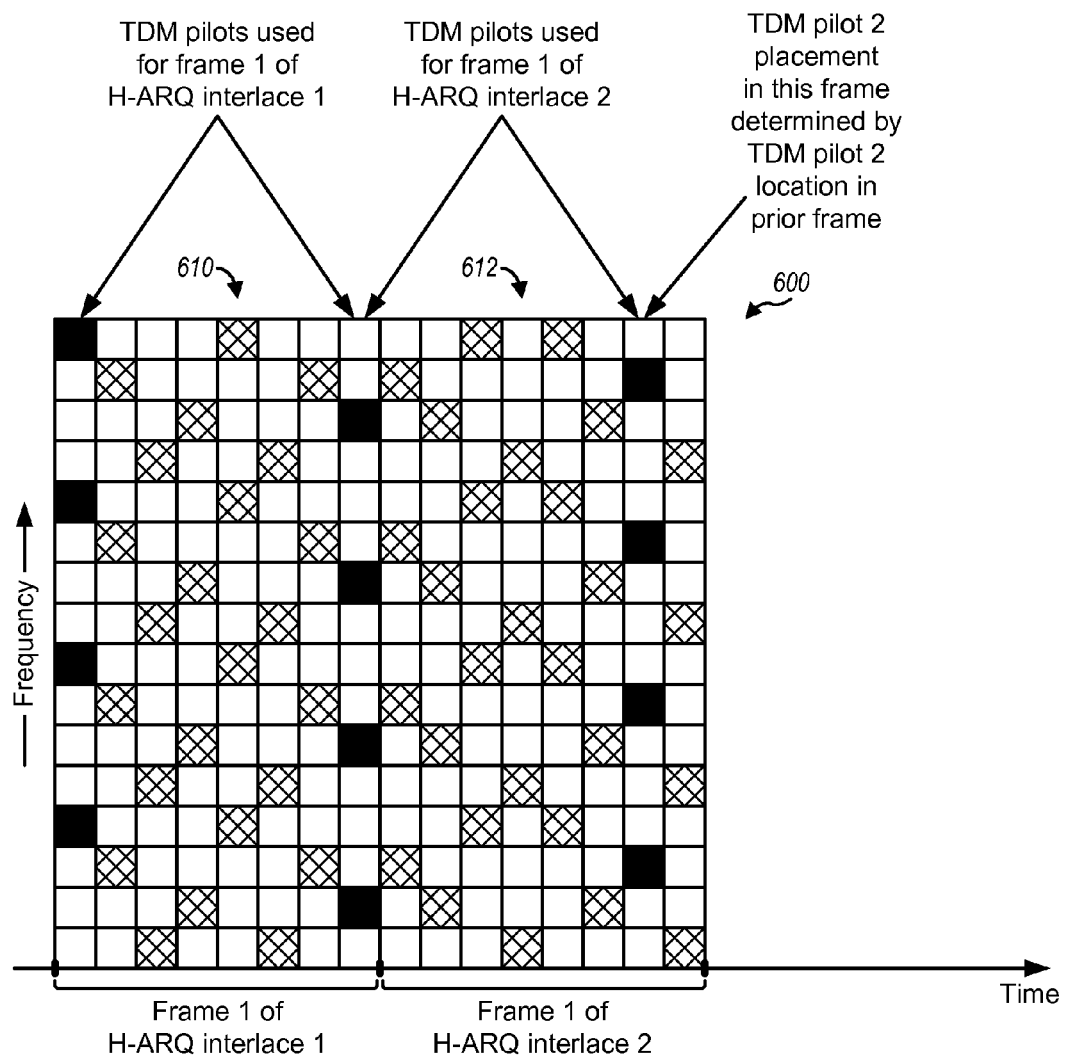
FIG. 6A shows dynamic pilots for a transmission burst of two frames.

FIG. 6A shows an embodiment of pilot placement 600 for a transmission burst of two frames. In this embodiment, for the first frame of the transmission burst, a single-frame pilot pattern 610 is selected to provide good performance for this frame, without relying on any pilots in a prior frame, which does not exist. Pilot pattern 610 includes TDM pilots in the first and last symbol periods of the frame. For the second frame of the transmission burst, a single-frame pilot pattern 612 is selected to provide good performance for this frame with pilot pattern 610 being used for the prior frame. Pilot pattern 612 includes a TDM pilot in the second to last symbol period of the frame. The placement of the TDM pilot in pilot pattern 612 is determined by the placement of the TDM pilots in pilot pattern 610 used in the prior frame.

Figure 6B:
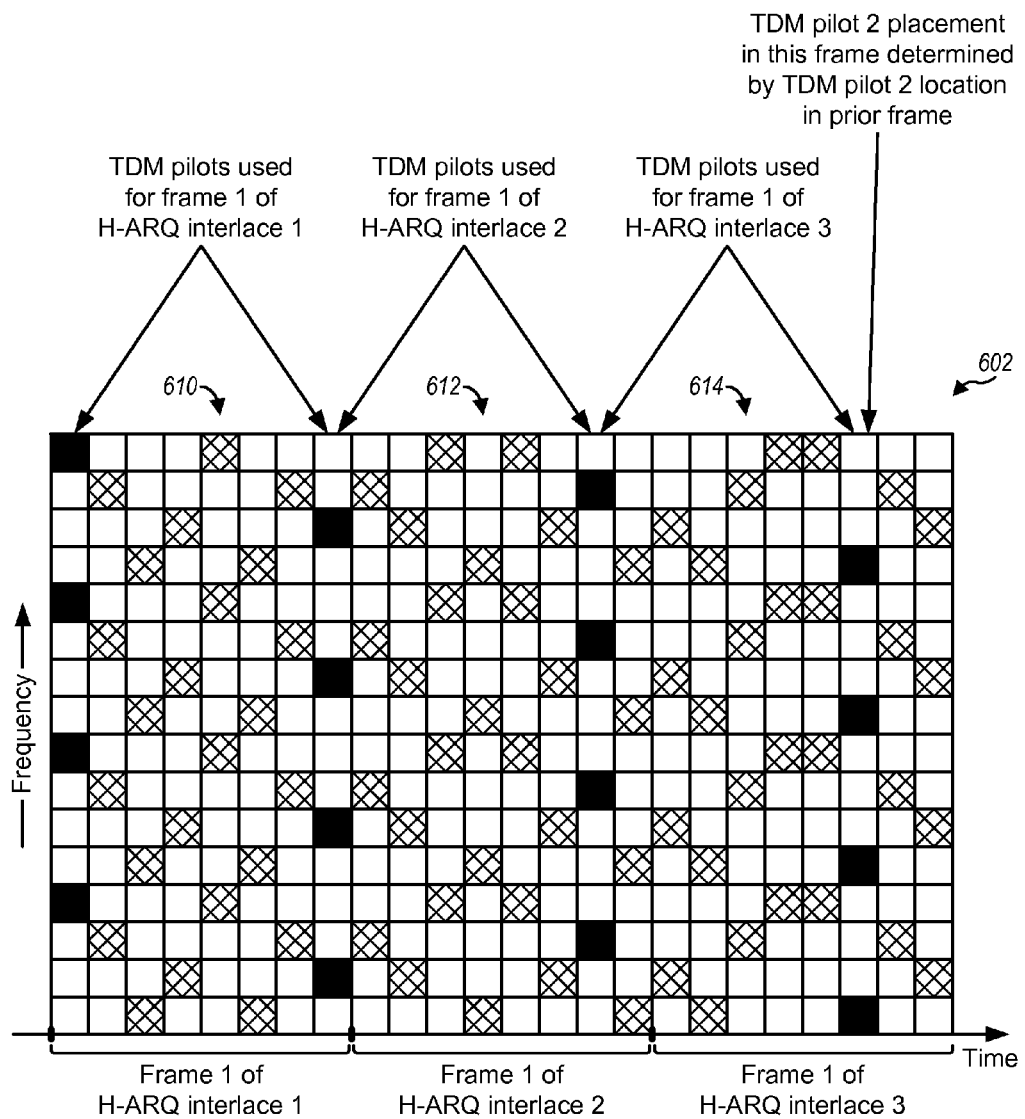
FIG. 6B shows dynamic pilots for a transmission burst of three frames.

FIG. 6B shows an embodiment of pilot placement 602 for a transmission burst of three frames. In this embodiment, pilot pattern 610 is used for the first frame of the transmission burst, and pilot pattern 612 is used for the second frame, as described above. For the third frame, a single-frame pilot pattern 614 is selected to provide good performance for this frame with pilot pattern 612 being used for the second frame. Pilot pattern 614 includes a TDM pilot in the third to last symbol period of the frame. The placement of the TDM pilot in pilot pattern 614 may be determined by the placement of the TDM pilots in pilot pattern 612 used in the prior frame or pilot patterns 610 and 612 in the two prior frames.

FIGS. 6A and 6B show embodiments in which the pilot patterns maintain a uniform spacing of 7 symbol periods between consecutive TDM pilots. This embodiment may be extended to cover assignments of more than three consecutive frames. The TDM pilot for each subsequent frame may be sent one symbol period earlier to maintain the same spacing. Other pilot patterns may also be used for transmission.

The transmitter and receiver may both know in advance the specific pilot patterns to use as resources are dynamically assigned. This can avoid the need to send signaling to convey the pilot patterns to use. If each resource assignment is associated with a specific pilot pattern, then the signaling to convey the resource assignment may be considered as implicit signaling for the associated pilot pattern. Alternatively, signaling may be explicitly sent to convey the pilot patterns to use.

In the embodiments shown in FIGS. 5A through 6B, the receiver may save the pilot observations of the current and possibly prior frames for use for channel estimation in later frames. The use of pilot observations from one frame for channel estimation in another frame allows for re-optimizing of the pilot locations as well as reduction in pilot overhead in later frames. Hence, overall system efficiency may be improved without impacting performance.

FIGS. 4A through 6B show embodiments in which each symbol period has the same duration. A TDM pilot may also be sent in a symbol period that is shorter or longer than a symbol period for data. For example, a shorter TDM pilot of approximately half the duration may be generated by performing a P-point FFT on P pilot symbols, mapping the P frequency-domain values to P assigned subcarriers, inserting zero values for the K/2−P remaining subcarriers, performing a K/2-point IFFT, and appending a cyclic prefix. Each subcarrier in the shorter TDM pilot would then span two consecutive subcarriers in the regular TDM pilot.

For clarity, the pilot transmission techniques have been described with TDM pilots being sent on uniformly distributed subcarriers. These TDM pilots may be generated in different manners for IFDMA and OFDMA, as described above. The pilot transmission techniques may also be used for LFDMA and EFDMA as well as for OFDMA with other subcarrier structures. In general, the pilot should be distributed across both a frequency range of interest and time in order to capture frequency and time variations in the channel. The frequency range of interest typically covers the frequency range used for data transmission, which may be the entire system bandwidth or a portion of the system bandwidth.

For subcarrier structure 300 in FIG. 3A and subcarrier structure 320 in FIG. 3C, each subcarrier set spans across the entire system bandwidth. A TDM pilot sent on one subcarrier set may then be used to estimate the channel response across the entire system bandwidth. Hence, a reduction in the number of TDM pilots may be achieved as described above regardless of whether or not frequency hopping is employed.

For subcarrier structure 310 in FIG. 3B, each subcarrier set spans only a fraction of the entire system bandwidth. A TDM pilot sent on one subcarrier set may then be used to estimate the channel response across a fraction of the system bandwidth. If frequency hopping is not employed and the same subcarrier set is used in different frames, then a reduction in the number of TDM pilots may be achieved as described above. If frequency hopping is employed and different subcarrier sets are used in different frames, then the pilot observations for one frame may not be applicable for another frame if these frames occupy different frequency ranges. Hence, TDM pilot reduction may be achieved whenever the pilot observations for one frame may be used for another frame.

For both SC-FDMA and OFDMA, TDM pilots may be sent as described above, with the TDM pilots providing lower PAPR for SC-FDMA. For both SC-FDMA and OFDMA, pilot and data symbols may also be multiplexed on different subcarriers in the same symbol period, albeit with higher PAPR for SC-FDMA. The multiplexing of pilot and data may provide more flexibility in reducing pilot overhead. For example, if one subcarrier set is assigned, then pilot may be sent on half of the subcarriers in the last symbol period of one frame and on half of the subcarriers in the first symbol period of the next frame. If multiple subcarrier sets are assigned, then pilot may be sent on one subcarrier set, and data may be sent on the remaining subcarrier set(s).

The pilots sent by the transmitter may be used by the receiver to derive various types of channel information. The receiver may derive a frequency-domain channel frequency response estimate and/or a time-domain channel impulse response estimate based on the received pilots. The receiver may also estimate the received signal quality for the transmitter based on the received pilots. Signal quality may be quantified by a signal-to-noise ratio (SNR), a signal-to-noise-and-interference ratio (SINR), a carrier-to-interference ratio (C/I), an energy-per-symbol-to-noise ratio (Es/No), and so on. The received signal quality may be conveyed by a channel quality indication (CQI) report, a packet format, a data rate, and so on. The receiver may also derive an interference estimate based on the received pilots. Techniques for deriving these various estimates are known in the art and not described herein.

The pilot transmission techniques described herein may be used for various multiplexing schemes and various types of pilot, as noted above. The techniques are especially advantageous for systems that utilize TDM pilots, e.g., to maintain low PAPR for IFDMA, LFDMA, and EFDMA. The use of TDM pilots limits the degree of freedom in reducing pilot overhead. The techniques can reduce pilot overhead for TDM pilots as well as other types of pilot while maintaining good performance.

Figure 7:
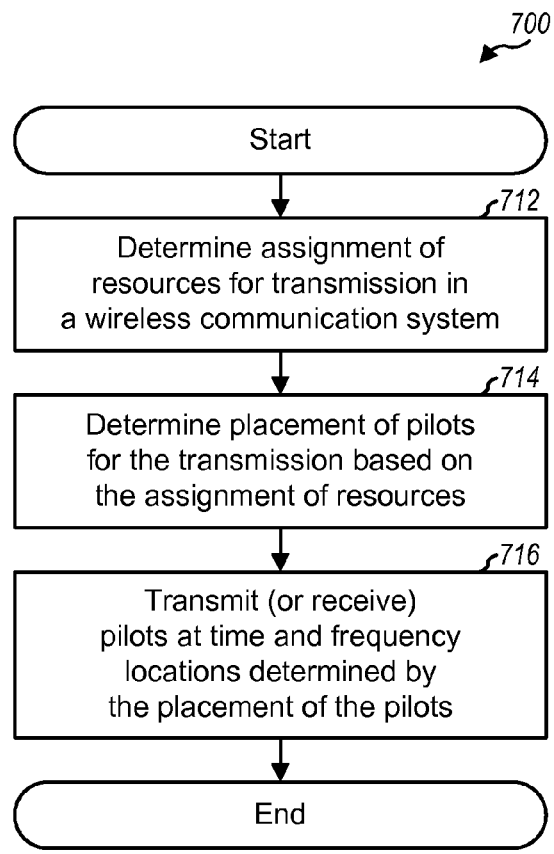
FIG. 7 shows a process for transmitting or receiving configurable pilots.

FIG. 7 shows an embodiment of a process 700 for transmitting or receiving configurable pilots. Process 700 may be performed by the transmitter or receiver. An assignment of resources for transmission in a wireless communication system is determined (block 712). Different placements of pilots are used for different assignments of resources. The placement of pilots for the transmission is then determined based on the assignment of resources (block 714). Pilots are transmitted by the transmitter (or received by the receiver) at time and frequency locations determined by the placement of the pilots (block 716).

The assignment may be for one or more consecutive frames. The placement of at least one pilot in each frame may then be determined based on the placement of at least one pilot in at least one prior frame. For example, at least one symbol period to use for at least one pilot in the current frame may be determined based on at least one symbol period used for at least one pilot in a prior frame. The pilots may be placed uniformly across the frames or in other manners.

The assignment may be for one or more H-ARQ interlaces. The placement of at least one pilot in each H-ARQ interlace may then be determined based on the number of H-ARQ interlaces in the assignment, the placement of at least one pilot in a preceding H-ARQ interlace, and so on.

The assignment of resources may be static and used for the entire transmission. The pilot placement may then be static and known a priori based on the assignment. Alternatively, the assignment of resources may be dynamic and variable during the transmission. For example, whether the next frame is assigned may not be known until the current frame. The pilot placement may then be dynamic and may be ascertained as additional resources are assigned.

The placement of pilots may be determined by one or more pilot patterns. Different pilot patterns may be used for different assignments of resources. At least one pilot pattern may be selected for use based on the assignment. If the assignment comprises multiple consecutive frames, then the pilot pattern to use for each frame may be determined based on the pilot pattern used for a prior frame In general, each pilot may be sent on one or more subcarriers in one or more symbol periods. The pilots may be TDM pilots, with each TDM pilot being sent on all assigned subcarriers in a predetermined time duration, e.g., one symbol period. The placement of each TDM pilot may be determined based on the assignment. The pilots may be sent using various multiplexing schemes such as IFDMA, LFDMA, EFDMA, OFDMA, and so on. Pilots and data may be sent using the same or different multiplexing schemes.

Figure 8:
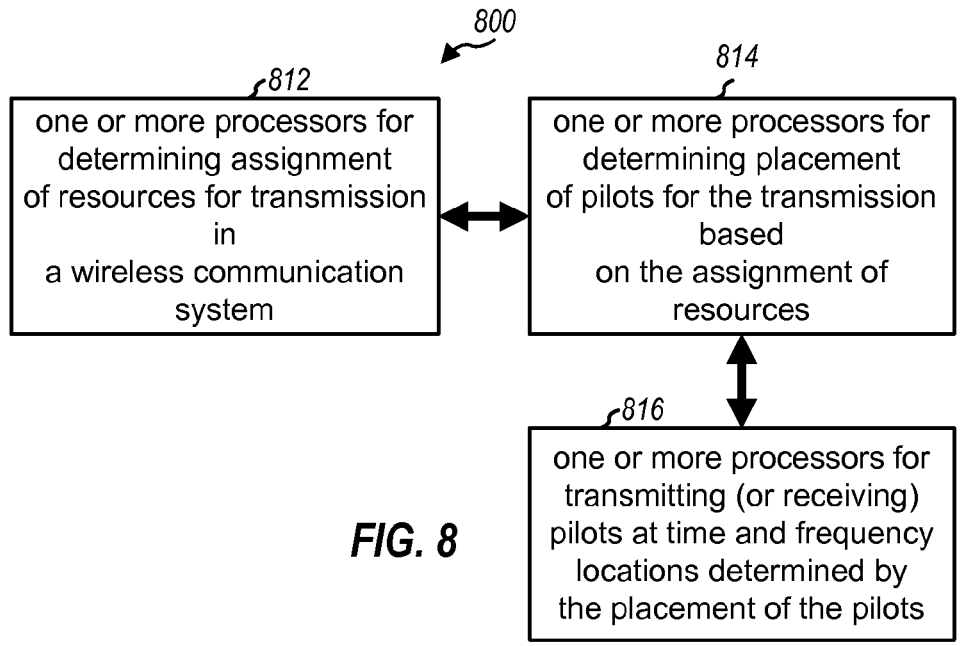
FIG. 8 shows an apparatus supporting configurable pilots.

FIG. 8 shows an embodiment of an apparatus 800 supporting configurable pilots. Apparatus 800 includes one or more processors for determining an assignment of resources for transmission in a wireless communication system (block 812), one or more processors for determining placement of pilots for the transmission based on the assignment of resources (block 814), and one or more processors for transmitting (or receiving) pilots at time and frequency locations determined by the placement of the pilots (block 816).

Figure 9:
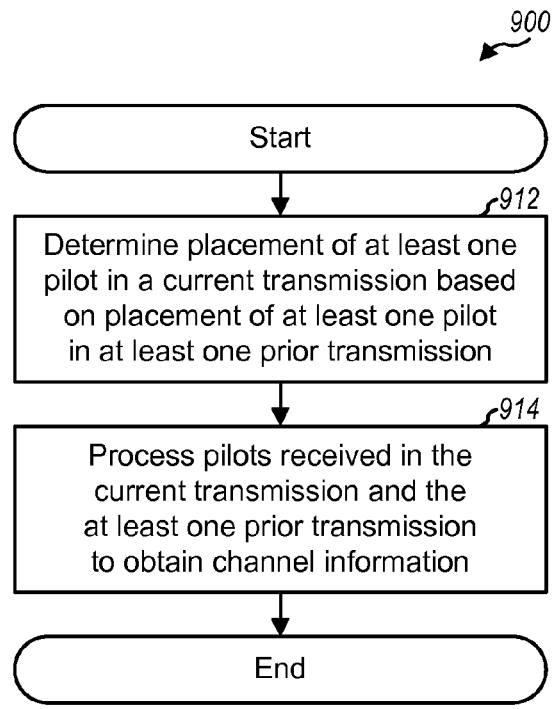
FIG. 9 shows a process for receiving configurable pilots.

FIG. 9 shows an embodiment of a process 900 for receiving configurable pilots. Process 900 may be performed by the receiver. Placement of at least one pilot in a current transmission is determined based on placement of at least one pilot in at least one prior transmission (block 912). Pilots received in the current transmission and the at least one prior transmission are processed to obtain channel information (block 914). Different placements of pilots may be used for different assignments of resources. The placement of pilots in the current and prior transmissions may then be determined based on the assignment of resources. The current and prior transmissions may be received in consecutive frames, on different H-ARQ interlaces, and so on. Each transmission may be a transmission in a frame, on an H-ARQ interlace, and so on. The channel information may comprise a channel frequency response estimate, a channel impulse response estimate, a receive signal quality estimate, an interference estimate, some other estimates, or a combination thereof.

Figure 10:
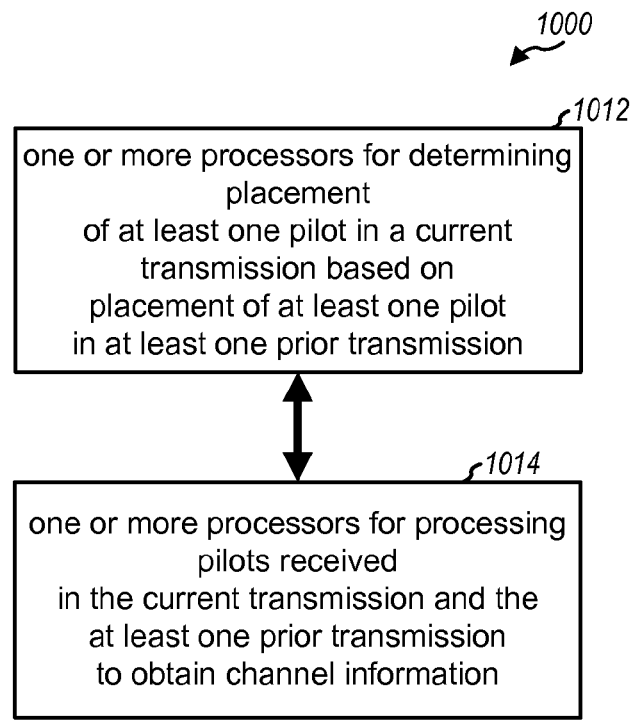
FIG. 10 shows an apparatus for receiving configurable pilots.

FIG. 10 shows an embodiment of an apparatus 1000 for receiving configurable pilots. Apparatus 1000 includes one or more processors for determining placement of at least one pilot in a current transmission based on placement of at least one pilot in at least one prior transmission (block 1012), and one or more processors for processing pilots received in the current transmission and the at least one prior transmission to obtain channel information (block 1014).

The pilot transmission techniques described herein may be implemented by various means. For example, these techniques may be implemented in hardware, firmware, software, or a combination thereof. For a hardware implementation, the processing units at a transmitter or a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with instructions (e.g., procedures, functions, and so on) that may be used by one or more processors that perform the functions described herein. The firmware and/or software instructions may be stored in a memory (e.g., memory 142 or 182 in FIG. 1) and executed by one or more processors (e.g., processor 140 or 180). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus to transmit or receive configurable pilots in an efficient manner to achieve good performance while reducing pilot overload comprising:
at least one processor configured to:
a) determine an assignment of resources for transmission or receiving in a wireless communication system, and
b) select pilot placements based on the assignment of resources, wherein different pilot placements are used for different assignments of resources, that correspond to either different numbers of frames, different numbers of H-ARQ interlaces or different numbers of subcarriers,
a memory coupled to the at least one processor; wherein the assignment is for at least one H-ARQ interlace, and wherein the at least one processor is configured to determine a placement of at least one pilot in each of the at least one H-ARQ interlace based on the number of H-ARQ interlaces in the assignment or the placement of pilots in preceding interlaces;
wherein the assignment comprises at least one frame, each frame spanning a predetermined time duration.

2. The apparatus of claim 1, wherein the at least one processor is configured to select by determining placement of at least one pilot in each frame based on placement of at least one pilot in at least one prior frame.

3. The apparatus of claim 1, wherein the at least one processor is configured to determine at least one symbol period to use for at least one pilot in each frame based on at least one symbol period used for at least one pilot in at least one prior frame.

4. The apparatus of claim 1, wherein the pilots are placed uniformly across the at least one frame.

5. The apparatus of claim 1, wherein the placement of the at least one pilot in each H-ARQ interlace is determined based on the number of H-ARQ interlaces in the assignment.

6. The apparatus of claim 1, wherein the placement of the at least one pilot in each H-ARQ interlace is determined based on the placement of at least one pilot in a preceding H-ARQ interlace.

7. The apparatus of claim 1, wherein different pilot patterns are associated with different assignments of resources, and wherein the at least one processor is configured to determine at least one pilot pattern to use for the pilots based on the assignment of resources.

8. The apparatus of claim 1, wherein the at least one processor is configured to determine a pilot pattern to use for each frame based on a pilot pattern for a prior frame, if any.

9. The apparatus of claim 1, wherein the pilots comprise time division multiplexed (TDM) pilots, and wherein the at least one processor is configured to determine placement of each of the TDM pilots based on the assignment of resources.

10. The apparatus of claim 1, wherein the at least one processor is configured to send the pilots at time and frequency locations determined by the placement of the pilots.

11. The apparatus of claim 1, wherein the at least one processor is configured to receive the pilots from time and frequency locations determined by the placement of the pilots.

12. The apparatus of claim 1, wherein the pilots are sent using Interleaved Frequency Division Multiple Access (IFDMA).

13. The apparatus of claim 1, wherein the pilots are sent using Single-Carrier Frequency Division Multiple Access (SC-FDMA) or Orthogonal Frequency Division Multiple Access (OFDMA).

14. The apparatus of claim 1, wherein the assignment of resources is static and used for the entire transmission.

15. The apparatus of claim 1, wherein the assignment of resources is dynamic and variable during the transmission.

16. A method to transmit or receive configurable pilots in an efficient manner to achieve good performance while reducing pilot overhead comprising:
determining an assignment of resources that correspond to either different numbers of frames, different numbers of H-ARQ interlaces or different numbers of subcarriers for transmission in a wireless communication system; wherein the assignment comprises at least one H-ARQ interlace,
selecting pilot placements based on the assignment of resources, wherein different pilot placements are used for different assignments of resources; and wherein selecting comprises determining placement of at least one pilot in each H-ARQ interlace based on placement of at least one pilot in a preceding H-ARQ interlace.

17. The method of claim 16, wherein the assignment comprises at least one frame, and wherein selecting comprises
determining placement of at least one pilot in each frame based on placement of at least one pilot in at least one prior frame.

18. The method of claim 16, wherein the pilots comprise time division multiplexed (TDM) pilots, and wherein selecting comprises
determining placement of each of the TDM pilots based on the assignment of resources.

19. The method of claim, 16, wherein the pilots are sent using Single-Carrier Frequency Division Multiple Access (SC-FDMA) or Orthogonal Frequency Division Multiple Access (OFDMA).

20. An apparatus to transmit or receive configurable pilots in an efficient manner to achieve good performance while reducing pilot overhead comprising:
means for determining an assignment of resources for transmission or receiving in a wireless communication system; wherein the assignment is for at least one H-ARQ interlace, and wherein the means for selection comprises means for determining placement of at least one pilot in a preceding H-ARQ interlace,
means for determining pilot placements based on the assignment of resources, wherein different pilot placements are used for different assignments of resources that correspond to either different numbers of frames, different numbers of H-ARQ interlaces or different numbers of subcarriers.

21. The apparatus of claim 20, wherein the assignment comprises at least one frame, and wherein the means for selecting comprises
means for determining placement of at least one pilot in each frame based on placement of at least one pilot in at least one prior frame.

22. The apparatus of claim 20, wherein the pilots comprise time division multiplexed (TDM) pilots, and wherein the means for selecting comprises
means for determining placement of each of the TDM pilots based on the assignment of resources.

23. The apparatus of claim 20, wherein the pilots are sent using Single-Carrier Frequency Division Multiple Access (SC-FDMA) or Orthogonal Frequency Division Multiple Access (OFDMA).

24. An apparatus comprising:
at least one processor configured
to determine at least one location of at least one pilot in a current transmission or reception based on at least one location of at least one pilot in at least one prior transmission, and
to process pilots received in the current transmission and the at least one prior transmission to obtain channel information; and
a memory coupled to the at least one processor; wherein at least one processor is configured to receive the current transmission and the at least one prior transmission on multiple H-ARQ interlaces;
wherein the pilots comprise time division multiplexed (TDM) pilots, and wherein the at least one processor is configured to determine at least one location of at least one TDM pilot in the current transmission or reception based on at least one location of at least one TDM pilot in the at least one prior transmission or reception.

25. The apparatus of claim 24, wherein the at least one processor is configured to receive the current transmission or reception and the at least one prior transmission in consecutive frames.

26. The apparatus of claim 24, wherein the channel information comprises a channel frequency response estimate, a channel impulse response estimate, a receive signal quality estimate, an interference estimate, or a combination thereof.

27. A method to transmit or receive configurable pilots in an efficient manner to achieve good performance while reducing pilot overhead comprising:
determining an assignment of resources that correspond to either different numbers of frames, different numbers of H-ARQ interlaces or different numbers of subcarriers
determining at least one location of at least one pilot in a current transmission or reception based on at least one location of at least one pilot in at least one prior transmission; and
processing pilots received in the current transmission or reception and the at least one prior transmission or reception to obtain channel information;
wherein the pilots comprise time division multiplexed (TDM) pilots, and wherein the determining at least one location of the at least one pilot in the current transmission or reception comprises
determining at least one location of at least one TDM pilot in the current transmission or reception based on placement of at least one TDM pilot in the at least one prior transmission.

28. The method of claim 27, further comprising:
receiving the current transmission and the at least one prior transmission in consecutive frames.

29. An apparatus to transmit or receive configurable pilots in an efficient manner to achieve good performance while reducing pilot overhead comprising:
means for determining an assignment of resources that correspond to either different numbers of frames, different numbers of H-ARQ interlaces or different numbers of subcarriers;
means for determining placement of at least one pilot in a current transmission or reception based on at least one location of at least one pilot in at least one prior transmission or reception; and
means for processing pilots received in the current transmission or reception and the at least one prior transmission or reception to obtain channel information;
wherein the pilots comprise time division multiplexed (TDM) pilots, and wherein the
means for determining at least one location of the at least one pilot in the current transmission or reception comprises
means for determining at least one location of at least one TDM pilot in the current transmission or reception based on at least one location of at least one TDM pilot in the at least one prior transmission or reception.

30. The apparatus of claim 29, further comprising:
means for receiving the current transmission and the at least one prior transmission in consecutive frames.

31. A non-transitory processor readable media including instructions thereon that may be performed by one or more processors for determining placement of configurable pilots for transmission based on an assignment of resources that correspond to either different numbers of frames, different numbers of H-ARQ interlaces or different numbers of subcarriers to transmit or receive configurable pilots in an efficient manner to achieve good performance while reducing pilot, the instructions comprising:
instructions for determining at least one location of at least one pilot in a current transmission or reception based on at least one location of at least one pilot in at least one prio
r transmission or reception; and
instructions for processing pilots received in the current transmission or reception and the at least one prior transmission or reception to obtain channel information; and
wherein the pilots comprise time division multiplexed (TDM) pilots, and wherein the at least one processor is configured to determine at least one location of at least one TDM pilot in the current transmission or reception based on at least one location of at least one TDM pilot in at least one prior transmission or reception.

* * * * *